(12) United States Patent
Schmidt et al.

(10) Patent No.: US 11,878,627 B2
(45) Date of Patent: Jan. 23, 2024

(54) METHOD FOR OPERATING AN ASSISTANCE SYSTEM OF A MOTOR VEHICLE

(71) Applicant: AUDI AG, Ingolstadt (DE)

(72) Inventors: Valentin Schmidt, Neuburg an der Donau (DE); Tilman Armbruster, Ingolstadt (DE); Johannes Reschke, Langquaid (DE); Faruk Krijestorac, Selm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/794,519

(22) PCT Filed: Nov. 25, 2020

(86) PCT No.: PCT/EP2020/083276
§ 371 (c)(1),
(2) Date: Jul. 21, 2022

(87) PCT Pub. No.: WO2021/148166
PCT Pub. Date: Jul. 29, 2021

(65) Prior Publication Data
US 2023/0050851 A1 Feb. 16, 2023

(30) Foreign Application Priority Data
Jan. 21, 2020 (DE) ...................... 10 2020 101 280.2

(51) Int. Cl.
*G08G 1/16* (2006.01)
*B60Q 1/52* (2006.01)
(Continued)

(52) U.S. Cl.
CPC .............. *B60Q 1/52* (2013.01); *B60Q 1/247* (2022.05); *G08G 1/096716* (2013.01); *G08G 1/166* (2013.01); *B60Q 2400/50* (2013.01)

(58) Field of Classification Search
CPC ...... B60Q 1/52; B60Q 2400/50; G08G 1/166; G08G 1/096716
See application file for complete search history.

(56) References Cited

U.S. PATENT DOCUMENTS 9,481,287 B2 * 11/2016 Marti ................. G01C 21/3697
9,896,107 B1 * 2/2018 Huang ............ B60W 30/18163
(Continued)

FOREIGN PATENT DOCUMENTS

DE    102015213481 A1    1/2017
DE    102015201764 B4    4/2018
(Continued)

OTHER PUBLICATIONS

International Preliminary Report on Patentability directed to related International Patent Application No. PCT/EP2020/083276, completed Apr. 25, 2022, with attached English-language translation; 11 pages.
(Continued)

*Primary Examiner* — Sisay Yacob
(74) *Attorney, Agent, or Firm* — Sterne, Kessler, Goldstein & Fox P.L.L.C.

(57) ABSTRACT

The present disclosure relates to a method for operating an assistance system of a motor vehicle, wherein the assistance system has a projector. A message relating to a wrong-way driver is received, and a position of the wrong-way driver transmitted with the message is compared with a current position. Depending on the comparison, a recommendation for adapting a driving parameter is projected into an area in front of the motor vehicle for the driver by means of the projector. The present disclosure also relates to an assistance system of a motor vehicle and to a motor vehicle.

8 Claims, 2 Drawing Sheets

(51) Int. Cl.
    *G08G 1/0967*    (2006.01)
    *B60Q 1/24*    (2006.01)

(56) References Cited

U.S. PATENT DOCUMENTS

| | | | |
|---|---|---|---|
| 10,173,577 B2 * | 1/2019 | Albou | B60Q 1/02 |
| 11,066,009 B2 * | 7/2021 | Tatara | B60Q 1/543 |
| 11,230,223 B1 * | 1/2022 | Lee | B60Q 1/08 |
| 2008/0238723 A1 * | 10/2008 | Fein | G08G 1/0968 |
| | | | 340/988 |
| 2012/0044090 A1 * | 2/2012 | Kahler | B60Q 1/245 |
| | | | 340/905 |
| 2017/0015242 A1 | 1/2017 | Rentel et al. | |
| 2018/0251064 A1 * | 9/2018 | Albou | G06F 3/011 |
| 2019/0378407 A1 * | 12/2019 | Correia | G08G 1/09675 |
| 2021/0197846 A1 * | 7/2021 | Thakur | G01S 17/931 |

FOREIGN PATENT DOCUMENTS

| | | |
|---|---|---|
| DE | 102017200781 A1 | 7/2018 |
| DE | 102017201924 A1 | 8/2018 |
| DE | 102008061747 A1 | 6/2019 |
| DE | 102017223439 A1 | 6/2019 |
| EP | 2610837 A2 | 7/2013 |
| EP | 3428901 A1 | 1/2019 |

OTHER PUBLICATIONS

International Search Report and Written Opinion of the International Searching Authority directed to related International Patent Application No. PCT/EP2020/083276, dated Feb. 17, 2021, with attached English-language translation; 17 pages.

* cited by examiner

METHOD FOR OPERATING AN ASSISTANCE SYSTEM OF A MOTOR VEHICLE

TECHNICAL FIELD

The present disclosure relates to a method for operating an assistance system of a motor vehicle and to an assistance system of a motor vehicle and also to a motor vehicle.

BACKGROUND

When motor vehicles, such as passenger cars, are operated manually, it is possible for the driver to misjudge a current driving situation and to move in a lane opposite to the direction of travel for which the lane is intended. In this case, the motor vehicle represents a wrong-way driver. The probability of this is greater, especially in the evening and at night, when visual detection of traffic signs and environmental situations is more difficult. Even with automated operation of the motor vehicle, it is possible for the motor vehicle to be moved in the opposite direction to the intended direction of travel in the event of a malfunction.

If another road user, such as another motor vehicle, is moving in the intended direction of travel in the same lane, there is the possibility of a collision. If another road user is moving in the same lane in the direction of travel, there is a possibility of a collision. In this case, the possible damage in the event of a collision is comparatively great, since both road users, i.e. the two motor vehicles, are each moving towards one another at the same speed. It is therefore necessary to warn both road users. A radio announcement or the like is usually selected for this, in which a corresponding message is sent to the motor vehicles by means of radio waves, for example as part of a traffic announcement.

The driver of the other motor vehicle is thus warned acoustically that a wrong-way driver is driving in his vicinity. A corresponding warning is also usually output on a display arranged in an interior of the other motor vehicle. It is also known to use projectors to project a warning onto the front or rear of the other motor vehicle, so that all road users moving in the area of the other motor vehicle who have not received the message regarding the wrong-way driver are also given a visual warning.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
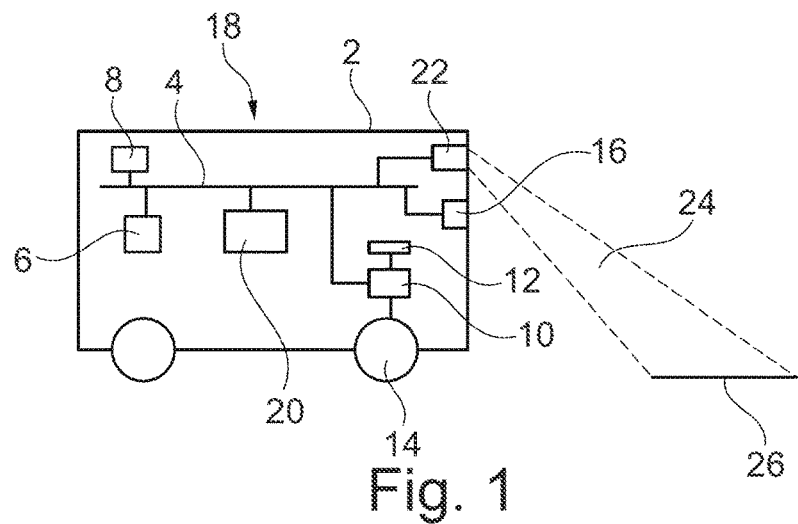
FIG. 1 is a schematically simplified view of a motor vehicle with an assistance system, according to the present disclosure.

The aim of the present disclosure is to specify a particularly suitable method for operating an assistance system in a motor vehicle and a particularly suitable assistance system in a motor vehicle, as well as a particularly suitable motor vehicle, wherein safety is advantageously increased.

According to an embodiment, this aim is achieved by the features of claim 1 with regard to the method, by the features of claim 8 with regard to the assistance system and by the features of claim 9 with regard to the motor vehicle. Advantageous further developments and embodiments are the subject matter of the respective dependent claims.

The method is used to operate an assistance system of a motor vehicle. The motor vehicle is a commercial vehicle, for example. However, the motor vehicle is particularly preferably a passenger car. For propulsion, the motor vehicle has, for example, an internal combustion engine, an electric motor or a combination thereof. In this case, the motor vehicle is provided and set up in particular to be moved on a road or at least on a road section. In other words, the motor vehicle is land-based.

The method provides that a message regarding a wrong-way driver is received. A position of the wrong-way driver is transmitted by means of the message, and also that he is moving in the opposite direction to the direction of travel along a specific road section. The position of the wrong-way driver is, for example, comparatively precise or has a number of individual positions/points where he may be located, i.e. in particular a route along the route section, wherein the start and end point of the route section are indicated.

In this case, the message is transmitted, for example, by means of radio waves from an external location to the motor vehicle and consequently also to the assistance system. For this purpose, the assistance system has a suitable radio receiver, for example, or is connected for signal exchange to the radio receiver, i.e. the unit for receiving the message. The message is, for example, a warning about the wrong-way driver, i.e. a road user who is moving along a lane in the opposite direction to the intended direction of travel. The external location is, for example, an official location or a radio transmitter, and the radio waves are transmitted in a non-directional manner, for example. In a further alternative, the message is sent specifically to the motor vehicle. In other words, the message is directed to the motor vehicle. In particular, a suitable standard is used for this, for example a WLAN standard or a mobile radio standard such as 3G, UMTS, or 5G. In particular, the message about the motor vehicle is transmitted using a C2C ("car to car)" or a C2X standard. In a further alternative, the external location is part of an infrastructure, and the message is created by the infrastructure, by means of which, for example, the wrong-way driver was detected.

In a further alternative, the message is created by the motor vehicle itself, in particular by means of a further assistance system. By means of this, in particular the wrong-way driver, i.e. the road user, is detected. A suitable sensor is expediently used for this purpose, for example a radar sensor or a camera. As an alternative to this, the detection takes place by means of evaluation of a corresponding message which is transmitted to the motor vehicle and which, for example, meets a WLAN, mobile radio, C2C, or C2X standard. Based on the detected road user and his direction of movement, which is also detected, a comparison of road data and/or navigation data stored in or queried by the further assistance system is used to check whether the road user is moving in or against the respective direction of travel for which the road section is intended. In particular, it is checked here whether the movement against the direction of travel took place for a specific period of time. If this is the case, the further assistance system is used to output the message relating to the wrong-way driver, which is received by the assistance system. The message relating to the wrong-way driver is thus created by the motor vehicle itself.

In a further working step, the position of the wrong-way driver transmitted with the message is compared with a current position. In other words, it is checked whether the two positions meet a certain condition. If this is the case, the comparison is in particular positive. The current position corresponds to the position at which the motor vehicle is currently located. Thus in the comparison it is checked whether the wrong-way driver is in the vicinity of the motor vehicle and also whether the distance is less than a specific limit value. Furthermore, it is expediently checked whether the motor vehicle and the wrong-way driver are on the same road section/route section, i.e. in particular on the same road. This therefore corresponds to a part of the condition. In particular, it is also checked whether the wrong-way driver is in front of the motor vehicle in the direction of travel, i.e. whether the wrong-way driver will be encountered, for example within a period of time that is, for example, 10 minutes, 5 minutes, or 1 minute. To summarize, it is checked whether the wrong-way driver poses a danger to the motor vehicle, since an encounter will take place within the time segment.

Depending on the comparison, a recommendation for adapting a driving parameter is projected into an area in front of the motor vehicle for the driver by means of the projector. In other words, the projection takes place when the transmitted position of the wrong-way driver and the current position are less than the limit value apart and/or the motor vehicle and the wrong-way driver are on the same road section and are moving towards one another. In other words, the projection takes place when the comparison is positive and consequently the wrong-way driver poses a danger to the motor vehicle.

The area in front of the motor vehicle represents in particular a piece of ground and consequently a part of the road/road section along which the motor vehicle is moving. In particular, the recommendation is projected onto the same lane in which the motor vehicle is moving. A recommendation for adapting the driving parameter is thus output by means of the projector, so that this can be seen by the driver of the motor vehicle, which is why he can change the driving parameter according to the recommendation. In this case, it is not necessary for the driver of the motor vehicle to look away from the area in front of the motor vehicle, i.e. the area in which the wrong-way driver could appear. Thus, safety is increased. Since the recommendation for adapting the driving parameter is presented to the driver visually, he can see how the driving parameter is to be adapted. Thus, even in a state of fear and/or panic due to the wrong-way driver, the driver is not overwhelmed as to how his driving style should be adapted.

If the driver follows the recommendation for adapting the driving parameter, i.e. adapts the driving parameter according to the recommendation, the consequences of a collision with the wrong-way driver are reduced and/or the probability of a collision with the wrong-way driver is reduced. In other words, possible damage and consequently also a probability of injury to the driver of the motor vehicle are reduced. Thus, safety is increased.

For example, the recommendation is always projected into the same area located in front of the motor vehicle. If another road user or an object is present in this area, the projection is, for example, omitted. Alternatively, the recommendation is projected onto the object. The area into which the recommendation is projected is particularly preferably adapted so that it is always projected essentially onto a flat surface, i.e. in particular onto the road.

For example, the distance from the area to the motor vehicle is constant. In an alternative to this, the distance and/or other parameters of the area are adapted to a current speed of the motor vehicle or other environmental conditions and/or a state of the motor vehicle.

For example, the recommendation is projected into the area by means of the projector until the driver deactivates the assistance system or at least this function. In a further alternative, the projection is ended, for example, when a certain period of time has elapsed after receipt of the message, for example 5 minutes, 10 minutes, or 20 minutes. Alternatively or in combination with this, the projection is ended when the motor vehicle has reached the transmitted position of the wrong-way driver or has passed it. In other words, the projection of the recommendation is terminated if the comparison of the transmitted position with the now current position is negative. In a further alternative, for example, the message is received essentially continuously, for example every 30 seconds, every 60 seconds, or every 2 minutes. As long as the message is continuously received, the recommendation is projected. Then, when the receiving of the message stops, the projection of the recommendation also stops, for example essentially immediately or for example after 5 minutes, 2 minutes, or 1 minute. Alternatively or in combination with this, the projection of the recommendation is ended, for example, when a message is received that the wrong-way driver is no longer present.

For example, a speed is used as a driving parameter. In other words, a recommendation for adapting the speed is thus used by means of the projector. Here, for example, a specific speed is specified, which thus at least partially includes a number. In other words, there is a quantitative indication of the driving parameter. In an alternative to this, the (recommended) speed is specified qualitatively and thus projected, for example, such that the motor vehicle should be moving faster or slower. If the driver follows the recommendation, the motor vehicle will be moved at a comparatively safe speed. The consequences of a possible collision are thus reduced or the collision can be completely avoided. For example, the recommendation to adapt the speed is projected as long as the comparison is positive, i.e. in particular during the entire time that the projection takes place. As an alternative to this, the projection takes place until the actual speed of the motor vehicle matches the speed that is projected, i.e. in particular as soon as the actual speed is less than a specific threshold value. The predetermined/recommended/projected speed is expediently the threshold. The recommended, i.e. projected, speed is, for example, constant or dependent on the current actual speed and/or other parameters, such as the type of route section, i.e. in particular the road along which the motor vehicle is being moved.

Alternatively or particularly preferably in combination with this, a lane is used as a driving parameter. This occurs in particular when the section of road along which the motor vehicle is moving has a number of lanes that are intended to be traveled in the same direction of travel. The projection only takes place, for example, if the motor vehicle is not already in the lane that corresponds to the recommendation. In other words, the projection of the recommended lane is ended when the motor vehicle has reached the recommended lane. As an alternative to this, in this case the lane is also output by means of the projection, specifically the lane on which the motor vehicle is (currently) moving. Thus, the driver is deterred from changing lanes. In particular, the recommended lane is an outer lane of the multi-lane route section/road section. If driving on the right is mandatory, the recommended lane corresponds in particular to the outermost right lane. When driving on the left is mandatory, on the other hand, the recommended lane is expediently the outermost left lane. A collision is thus avoided if the wrong-way driver unintentionally moves in the opposite direction to the direction of travel and also adheres to the mandatory driving requirements. The recommended lane is preferably output by means of an arrow and/or a plurality of arrows which point to the recommended lane, i.e. to the left or right, for example. In this case, in particular, alternating lighting, i.e. flashing, of the arrows is used, so that the driver becomes aware of this.

For example, the recommendation is always created and thus projected when the comparison is positive. However, another road user is particularly preferably detected, and the recommendation is created depending on this. The other road user is detected, for example, by means of a corresponding sensor of the motor vehicle itself. The sensor includes a camera and/or a radar sensor, for example. In an alternative to this, the other road user is detected using a notification that is sent to the motor vehicle by the other road user or by an infrastructure. To summarize, the recommendation is also tailored to other road users, which increases safety. For example, if the lane is used as a driving parameter, the recommendation is prevented from being created, i.e. it is not created if the other road user is in the recommended lane directly next to the motor vehicle or directly between the motor vehicle and the recommended lane. When changing lanes, the motor vehicle would collide with the other road user. In this case, since the recommendation is not output, safety is further increased.

A distance from the other road user is particularly preferably used as a driving parameter, wherein the other road user is located in particular in front of the motor vehicle in the direction of travel. In other words, it is therefore recommended to change the distance from the other road user and to set it to a specific value, for example. For example, the recommended distance is output quantitatively and thus includes a specific number. However, the recommended distance is particularly preferably qualitatively projected, i.e. the recommendation to increase or decrease the distance. For this purpose, in particular, an arrow is used which points to or away from the other road user. Based on the recommendation, it is thus possible for the driver to set the distance from the other road user to a value, namely the recommended distance, at which the probability of a collision with the wrong-way driver is reduced. For example, the recommendation including the distance is projected until the comparison is negative, i.e. the current position of the motor vehicle with respect to the position of the wrong-way driver no longer meets the specific condition. However, the projection is particularly preferably already ended when the distance essentially corresponds to the recommended distance, with a deviation of 10 m, 5 m, or 2 m, for example. Thus, the driver of the motor vehicle is not excessively distracted. The recommended distance is, for example, always constant or particularly preferably dependent on a current situation, in particular the current speed of the motor vehicle.

In a further alternative, the recommendation is created depending on a driving maneuver. In particular, the recommendation comprising the one or more driving parameters is only projected when the driving maneuver has been detected, i.e. in particular the beginning of a driving maneuver. For example, the start of the driving maneuver, or measures that are preparatory thereto, are detected directly. In particular, an overtaking maneuver is used as a driving maneuver, and the recommendation is projected, for example, when the distance between the motor vehicle and a lateral boundary of a lane is less than a limit value, or the lane is being driven over. In other words, the driving maneuver begins in this case. During the overtaking maneuver, another road user located in front of the motor vehicle in the direction of travel is to be overtaken, for which purpose the lane must be changed. As an alternative to this, the recommendation is already projected when the driving maneuver, i.e. the overtaking maneuver, is predicted. For this purpose, the actuation of a travel direction indicator is used in particular. In other words, when it is detected that the overtaking maneuver is being performed or the driver is about to perform the overtaking maneuver, the recommendation is output. In particular, a no-overtaking sign is projected as a recommendation. Alternatively or in combination with this, a corresponding symbol, preferably a solid line, is projected in the area of an already existing roadway marking, in particular a lateral boundary of the lane, so that the driver is deterred from overtaking.

A driver's reaction to the projection of the recommendation is particularly preferably detected. If the driver's reaction does not correspond to the recommendation, i.e. the driver does not follow the recommendation and therefore does not adapt the driving parameter accordingly, a warning is output. The driver is thus advised to follow the recommendation. The warning is output acoustically, for example, preferably by means of a loudspeaker arranged in a (passenger) interior compartment of the motor vehicle. Alternatively or in combination with this, the warning is output visually, for example by means of the projector. Appropriately, the projected recommendation is adapted for this. In a further alternative, the warning is output, for example, on a display that is arranged in the passenger compartment.

The warning is particularly preferably output haptically. For this purpose, for example, a steering wheel of the motor vehicle is vibrated. In particular, a counterforce is exerted on a steering movement performed by the driver by means of the steering wheel, in particular a steering system which includes the steering wheel. This occurs in particular if the recommendation is created depending on the driving maneuver, wherein the overtaking maneuver is expediently used as the driving maneuver. In other words, if the driver of the motor vehicle starts the overtaking maneuver despite the contrary recommendation, a torque that counteracts the driver's steering movement is applied to the steering wheel. The driver is thus warned not to start the overtaking process. In particular, the torque is comparatively low here, so that the driver can still start the overtaking process, i.e. can compensate for the torque. It is thus possible, for example, to carry out the overtaking process if another dangerous situation occurred that was not detected by the assistance system.

The assistance system is a component of a motor vehicle and has in particular a unit for detecting a current position of the motor vehicle or at least an interface for coupling to such a unit for signal exchange. Furthermore, the assistance system expediently comprises a unit for detecting a message relating to a wrong-way driver or at least an interface for this, wherein the interface in particular is also used for coupling for signal exchange to any unit for detecting the current position. In this case, the interface in particular meets a bus standard.

The assistance system also has a projector, which is an LCD projector, for example. The projector expediently has a light source, by means of which a light beam can be created. Furthermore, the projector preferably has a number of units, by means of which the light beam can be manipulated, so that an image is output by means of the light beam, and the image can be changed by means of manipulation of the light beam. The image is output when the light beam impinges on an object. In this case, the projector is arranged in such a way that the light beam impinges on an area in front of the motor vehicle which is formed in particular by a road. For example, the projector is also used by other assistance systems, which reduces production costs.

The assistance system is operated according to a method in which a message relating to a wrong-way driver is received and in which a position of the wrong-way driver transmitted with the message is compared with a current position. A recommendation for adapting a driving parameter is projected for the driver by means of the projector into the area in front of the motor vehicle. The assistance system expediently comprises a control unit that is provided and set up to carry out the method. The projector and/or one of the possible units is preferably at least partially controlled and/or operated by means of the control unit.

The motor vehicle preferably has a number of wheels. By means of the wheels, contact is made in particular with an environment, expediently ground such as a lane. The autonomously moving motor vehicle is land-based and preferably can be moved independently of rails or the like. For example, the autonomously moving motor vehicle is a passenger car or a commercial vehicle, such as a truck or a bus. In particular, the motor vehicle is suitable, in particular provided and set up, to be moved autonomously, in particular automatically, wherein an automation level of up to level 3 is preferably achieved.

The motor vehicle includes an assistance system that includes a projector. In this case, the projector is suitable, in particular provided and set up, to emit/superimpose information in an area in front of the motor vehicle. For this purpose, in particular, a suitable light beam is generated by means of the projector, by means of which the area is illuminated. For this purpose, the projector is suitably mounted on other components of the motor vehicle.

The assistance system is operated according to a method in which a message relating to a wrong-way driver is received and in which a position of the wrong-way driver transmitted with the message is compared with a current position. A recommendation for adapting a driving parameter is projected for the driver by means of the projector into the area in front of the motor vehicle. The assistance system expediently has a suitable control unit for this.

The motor vehicle expediently has a bus system, for example a CAN bus system or a FlexRay bus system, by means of which the assistance system is coupled for signal exchange to other components of the motor vehicle, in particular to a GPS receiver for determining the current position, a radio receiver for receiving the message, a navigation system and/or a steering system. For example, the motor vehicle has the possible additional assistance system.

The advantages and developments described in connection with the method are analogously also applicable to the assistance system/motor vehicle and vice versa.

Figure 2:
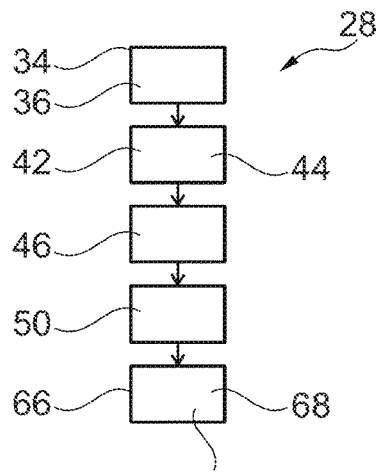
FIG. 2 shows a method for operating the assistance system, according to the present disclosure.
Figure 3:
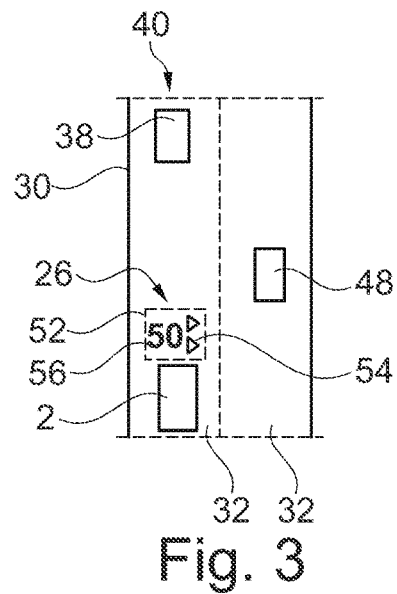
FIG. 3 show the motor vehicle moving on a roadway when the method is carried out in different situations, according to the present disclosure.
Figure 4:
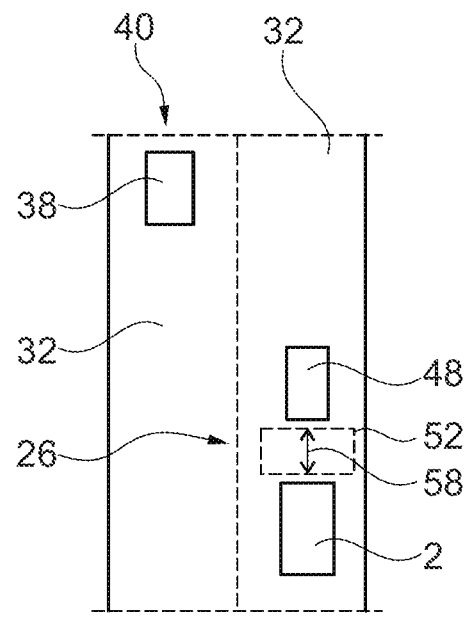
FIG. 4 show the motor vehicle moving on a roadway when the method is carried out in different situations, according to the present disclosure.
Figure 5:
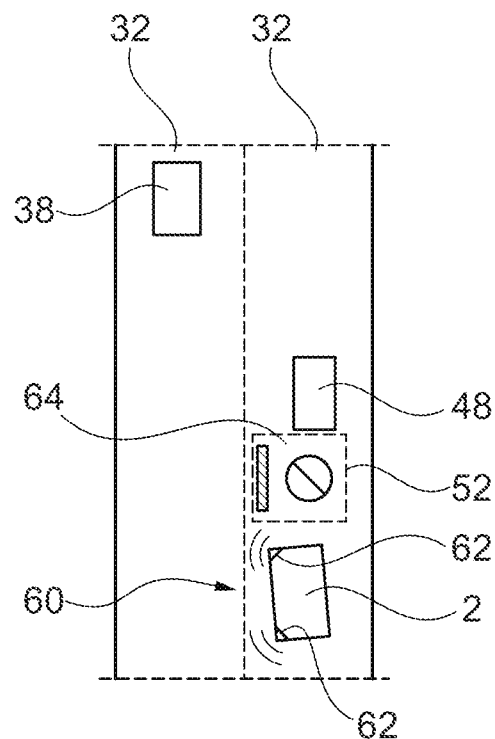
FIG. 5 show the motor vehicle moving on a roadway when the method is carried out in different situations, according to the present disclosure.

An embodiment of the present disclosure is explained in more detail below with reference to drawings. In the drawings:

FIG. 1 is a schematically simplified view of a motor vehicle with an assistance system, FIG. 2 shows a method for operating the assistance system, and FIG. 3-5 each show the motor vehicle moving on a roadway when the method is carried out in different situations.

Corresponding parts are provided with the same reference signs in all drawings.

FIG. 1 shows a motor vehicle 2 in the form of a passenger car in a schematically simplified manner. The motor vehicle 2 has a bus system 4 in the form of a FlexRay bus system. A unit for determining a current position 6, namely a GPS receiver, and a unit for receiving messages 8 are connected to the bus system 4 for signal exchange. Furthermore, a steering system 10, by means of which a direction of travel of the motor vehicle 2 is set, is connected to the bus system for signal exchange. For this purpose, the steering system 2 has a steering wheel 12 which is provided and set up to be gripped by a user of the motor vehicle 2, namely a driver. The front wheels 14 of the motor vehicle 2 are adjusted according to the operation of the steering wheel 12.

Furthermore, a sensor 16 in the form of a radar sensor is connected to the bus system 4. By means of the sensor 16 it is possible to detect other road users located in a front and lateral area around the motor vehicle 2. The motor vehicle also has an assistance system 18, which includes a control unit 20 and a projector 22, which are each also connected to the bus system 4 and are therefore connected to one another for signal exchange. By means of the projector 22 it is possible to create a light beam 24 during operation and thus to project images into an area 26 located in front of the motor vehicle, hereinafter also simply referred to as the area.

A method 28 for operating the assistance system 18 is shown in FIG. 2. The method 28 is carried out when the motor vehicle 2 is moved along a route section or road section of a road 30 shown in FIG. 3, which has two lanes 32, running parallel to one another and adjoining one another, which are to be driven on in the same direction of travel. The road section shown in FIG. 3, also referred to as a route section, of the road 30 thus represents, for example, a freeway or the like.

In a first working step 34, a message 36 relating to a wrong-way driver 38 is received by the assistance system 18. In this example, the wrong-way driver 38 is moving in the same lane 32 as the motor vehicle 2 and is located in front of the motor vehicle 2 with respect to the direction of travel of the latter. The message 36 is emitted by an official agency or a radio transmitter and is received by means of the unit 8 for receiving messages 36. From this, the message 36 is fed into the bus system 4 and is subsequently received by the control unit 20. The message 36 is thus received by the assistance system 18 via the bus system 4. In this case, the message 36 also contains a position 40 of the wrong-way driver 38. In this example, the position 40 of the wrong-way driver 38 corresponds to the route section shown in FIG. 3, i.e. a plurality of individual points along the road 30, namely a route which is located between two specific points on the road 30, such as interchanges or exits.

In its subsequent second working step 42, a current position 44 of the motor vehicle 2 is queried by the control unit 20 via the bus system 4 in the unit 6 for determining the current position. The current position 44 of the motor vehicle 2 is compared with the position 40 of the wrong-way driver 38. For this purpose, by means of navigation data stored in the control unit 20 or in a navigation system that is not shown in more detail a route section, namely that shown in FIG. 3, is assigned to the current position 44 of the motor vehicle 2. The position 40 of the wrong-way driver 38 is also assigned in this way. The comparison also checks whether the wrong-way driver 38 is in front of the motor vehicle 2 in the direction of travel, i.e. whether a collision or at least an encounter of the wrong-way driver 38 with motor vehicle 2 would occur within a subsequent time period of 10 minutes or 5 minutes. This is the case in the example shown in FIG. 3.

A third working step 46 is therefore carried out subsequently. In this step, another road user 48 is detected by means of the sensor 16. In the example shown, the other road user 48 is in front of the motor vehicle 2 in the direction of travel of the motor vehicle and in the lane 32 adjacent thereto. In a subsequent fourth working step 50, depending on the comparison of the position 40 of the wrong-way driver 38 with the current position 44 of the motor vehicle 2, and depending on the other road user 48, a recommendation 52 for the adaptation of a driving parameter is created and is projected by means of the projector 22 into the area 26 lying in front of the motor vehicle 2, for which a corresponding light beam 24 is created. In the example shown, a lane 54 is used as a driving parameter. In other words, the recommendation 52 includes the recommended lane 54. This is represented by arrows pointing to the respective lane 32. In the example shown, driving on the right is mandatory and the motor vehicle 2 is not moving in the outermost right lane 32. Therefore, the arrows point to the right, and the recommended lane 54 corresponds to the outermost right lane 32.

In addition, the recommendation 52 includes a recommended speed 56. If the motor vehicle 2 were to change lane 32 without adapting its speed, motor vehicle 2 would be too close to the other road user 48. Therefore, an adaptation of the speed of the motor vehicle 2 is required. In this way a collision with the motor vehicle 2 that is changing lane 32 is also ruled out. In addition, if the speed of the motor vehicle 2 were adapted to the recommended speed 56, the consequences of a collision of the motor vehicle 2 with the wrong-way driver 38 would be lessened.

If the motor vehicle 2 is moving at the recommended speed 56 and in the recommended lane 54, the recommendation 52 is no longer output by means of the projector 22, so that the driver of the motor vehicle 2 is not distracted. The method 28 is also repeated until the comparison is negative in the second working step 42. The output of the recommendation 52 is therefore also ended when the wrong-way driver 38 has passed the motor vehicle 2 and the comparison carried out in the second working step is consequently negative. The method 28 is also ended if a certain period of time has elapsed since the message 36 was received, or if it has not been transmitted for a certain period of time.

A different driving situation is shown in FIG. 4, in which the method 28 is also carried out. The road 30 and the wrong-way driver 38 have not changed. Again, the other road user 48 is also present. However, the motor vehicle 2 is moving behind the other road user 48 in the direction of travel in the same lane 32. The first to fourth working steps 34, 42, 46, 50 are carried out. Thus, here too, recommendation 52 is projected onto the area 26 in front of the motor vehicle 2. In this example, a recommended distance 58 from the other road user 48 is used as a driving parameter. The recommended distance 58 is symbolized by means of a double arrow. In other words, the recommended distance 58 is represented quantitatively. The driver of the motor vehicle 2 is informed by means of the double arrow that he should increase the distance from the other road user 48 so that there is sufficient space for both to carry out different driving maneuvers.

In this case, the recommendation 52 is only projected when the area 26 is free of the other road user 48. In order that this is the case, the area 26 and thus also the recommendation 52 are reduced so that they can be perceived by the driver of the motor vehicle 2. If the motor vehicle 2 is at the recommended distance from the other road user 48 or at a greater distance, the recommendation 52 is again no longer output. The method 28 is also repeated until the comparison carried out in the second working step 42 is negative, or the message 36 is no longer received.

FIG. 5 shows another driving situation in which the method 28 is also carried out. Here, too, the first and second working steps 34, 42 are carried out unchanged. The other road user 48 is also detected in the third working step 46. This in turn is located in the direction of travel of the motor vehicle 2 in front of it. Since the speed of the motor vehicle 2 corresponds to the recommended speed 46, and since the motor vehicle 2 is moving in the recommended lane 54, and since the distance between the motor vehicle 2 and the other road user 48 is the recommended distance 58 or greater, no recommendation 52 is initially output. However, the driver of the motor vehicle 2 intends to carry out a driving maneuver 60, namely an overtaking maneuver. For this purpose, the motor vehicle 2 is steered in the direction of the adjacent lane 32 and a corresponding travel direction indicator 62 is activated. The recommendation 52 is created depending on this driving maneuver 60 and is output by means of the projector 22. In this case, the recommendation 52 has an overtaking warning 64 which includes a corresponding traffic sign. A line of the overtaking warning 64 which is intended to prevent the driver of the motor vehicle 2 from carrying out the driving maneuver 60, namely the overtaking maneuver, is also projected in the area of a roadway marking between the two lanes 32.

In addition, a fifth working step 66 is carried out, in which a reaction 68 of the driver of the motor vehicle 2 is detected. If the reaction 68 does not correspond to the recommendation 52, a warning 70 is output. In other words, the warning 70 is output if the driver of the motor vehicle 2 nevertheless carries out the driving maneuver 60, i.e. the overtaking maneuver, and changes lanes 32 for this purpose. As a warning 70, the steering wheel 12 is vibrated. In other words, the driver of motor vehicle 2 is given a haptic warning. A corresponding control command is transmitted to the steering system 10 for this purpose. Alternatively or in combination with this, a torque which is directed against the operation of the driver is applied to the steering wheel 12 by means of the steering system 10. It is therefore necessary for the driver of the motor vehicle 2 to apply an increased torque so that the motor vehicle 2 is steered into the adjacent lane 32 and the overtaking maneuver can thus be carried out.

The invention is not limited to the embodiment described above. Rather, other variants of the invention can also be derived from this by a person skilled in the art without departing from the subject matter of the invention. In particular, all of the individual features described in connection with the embodiment can also be combined with one another in other ways without departing from the subject matter of the invention.

LIST OF REFERENCE SIGNS 2 motor vehicle
4 bus system
6 unit for determining a current position
8 unit for receiving messages
10 steering system
12 steering wheel
14 front wheel
16 sensor
18 assistance system
20 control unit
22 projector
24 light beam
26 area in front of the motor vehicle
28 method
30 road
32 lane
34 first working step
36 message
38 wrong-way driver
40 position of the wrong-way driver
42 second working step
44 current position
46 third working step
48 other road user
50 fourth working step
52 recommendation
54 recommended lane
56 recommended speed
58 recommended distance
60 driving maneuver
62 travel direction indicator
64 overtaking warning
66 fifth working step
68 reaction
70 warning

The invention claimed is:

1. A method for operating an assistance system of a motor vehicle, wherein the assistance system has a projector, the method comprising:
receiving a message relating to a wrong-way driver;
comparing a position of the wrong-way driver transmitted with the message to a current position of the motor vehicle, wherein the current position is a current location of the motor vehicle;
providing, depending on the comparison, a recommendation for adapting a driving parameter projected into an area in front of the motor vehicle for a driver of the motor vehicle by means of the projector;
detecting a reaction of the driver of the motor vehicle; and
outputting a warning if the reaction does not correspond to the recommendation.

2. The method according to claim 1, wherein the driving parameter comprises a speed.

3. The method according to claim 1, wherein the driving parameter comprises a lane.

4. The method according to claim 1, wherein a further road user is detected and the recommendation is created based on the detection.

5. The method according to claim 4, wherein the driving parameter comprises a distance from the other road user.

6. The method according to claim 1, wherein the recommendation is based on a driving maneuver.

7. An assistance system of a motor vehicle, wherein the assistance system comprises:
a projector;
a first unit for detecting a current position of the motor vehicle or a first interface for coupling to the first unit for signal exchange;
a second unit for detecting a message relating to a wrong-way driver or a second interface to the second unit; and
a control unit configured to:
receive the message;
compare a position of the wrong-way driver transmitted with the message to the current position, wherein the current position is a current location of the motor vehicle;
provide, depending on the comparison, a recommendation for adapting a driving parameter projected into an area in front of the motor vehicle for a driver of the motor vehicle by means of the projector;
detect a reaction of the driver of the motor vehicle; and
output a warning if the reaction does not correspond to the recommendation.

8. A motor vehicle having an assistance system wherein the assistance system comprises:
a projector;
a first unit for detecting a current position of the motor vehicle or a first interface for coupling to the first unit for signal exchange;
a second unit for detecting a message relating to a wrong-way driver or a second interface to the second unit; and
a control unit configured to:
receive the message;
compare a position of the wrong-way driver transmitted with the message to the current position, wherein the current position is a current location of the motor vehicle;
provide, depending on the comparison, a recommendation for adapting a driving parameter projected into an area in front of the motor vehicle for a driver of the motor vehicle by means of the projector;
detect a reaction of the driver of the motor vehicle; and
output a warning if the reaction does not correspond to the recommendation.

* * * * *